(12) United States Patent
Shah et al.

(10) Patent No.: US 9,872,205 B2
(45) Date of Patent: Jan. 16, 2018

(54) METHOD AND SYSTEM FOR SIDEBAND COMMUNICATION ARCHITECTURE FOR SUPPORTING MANAGEABILITY OVER WIRELESS LAN (WLAN)

(71) Applicant: Avago Technologies General IP (Singapore) Pte. Ltd., Singapore (SG)

(72) Inventors: Hemal Shah, Trabuco Canyon, CA (US); Suryakant Maharana, Bangalore (IN); Manoj Kamath, KasturiNagar (IN); Nisar Sotakanal, Sunnyvale, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 270 days.

(21) Appl. No.: 14/737,172

(22) Filed: Jun. 11, 2015

(65) Prior Publication Data
US 2015/0312802 A1 Oct. 29, 2015

Related U.S. Application Data

(62) Division of application No. 13/084,247, filed on Apr. 11, 2011, now abandoned.
(Continued)

(51) Int. Cl.
*H04W 40/34* (2009.01)
*H04W 28/14* (2009.01)
(Continued)

(52) U.S. Cl.
CPC .......... *H04W 28/14* (2013.01); *H04W 24/02* (2013.01); *H04W 40/04* (2013.01); *H04W 40/34* (2013.01);
(Continued)

(58) Field of Classification Search
CPC ..... H04W 24/02; H04W 28/14; H04W 40/04; H04W 40/34; H04W 84/12; H04W 88/12;
(Continued)

(56) References Cited

U.S. PATENT DOCUMENTS 7,130,899 B1   10/2006   Bauer et al.
2006/0068815 A1   3/2006   Caspi et al.
(Continued)

*Primary Examiner* — Afshawn Towfighi
*Assistant Examiner* — Mewale Ambaye
(74) *Attorney, Agent, or Firm* — Oblon, McClelland, Maier & Neustadt, L.L.P.

(57) ABSTRACT

A management controller in a network device may support performing management operations based on management traffic communicated wirelessly via a wireless network controller of the network devices. The management controller may perform the management operations and/or to support wireless communication of the management traffic independent of operations of the network device. The management controller may be integrated into a network controller in the network device. The management traffic may comprise out-of-band (OOB) management related traffic. A direct interface may be established between the management controller and the wireless network controller, to support direct sideband communication between the management controller and the wireless network controller. The sideband interface may incorporate Network Controller Sideband Interface (NC-SI) and/or Secure Digital Input Output (SDIO) interface. The management controller may control operations of the wireless network controller, by utilizing an embedded wireless controller driver.

15 Claims, 7 Drawing Sheets

Related U.S. Application Data

(60) Provisional application No. 61/349,016, filed on May 27, 2010.

(51) Int. Cl.
  *H04W 24/02* (2009.01)
  *H04W 40/04* (2009.01)
  *H04W 88/12* (2009.01)
  *H04W 88/18* (2009.01)
  *H04W 84/12* (2009.01)

(52) U.S. Cl.
  CPC ............ *H04W 84/12* (2013.01); *H04W 88/12* (2013.01); *H04W 88/18* (2013.01)

(58) Field of Classification Search
  CPC .. H04W 88/18; H04W 47/2483; H04L 69/22; H04L 41/06
  See application file for complete search history.

(56) References Cited

U.S. PATENT DOCUMENTS

| | | | | |
|---|---|---|---|---|
| 2008/0222151 | A1* | 9/2008 | Mittapalli | H04L 12/24 |
| 2008/0235363 | A1* | 9/2008 | Shah | H04L 67/125 |
| | | | | 709/223 |
| 2008/0263191 | A1* | 10/2008 | Shah | H04L 43/028 |
| | | | | 709/223 |
| 2010/0153763 | A1* | 6/2010 | Sood | G06F 1/3209 |
| | | | | 713/324 |

* cited by examiner

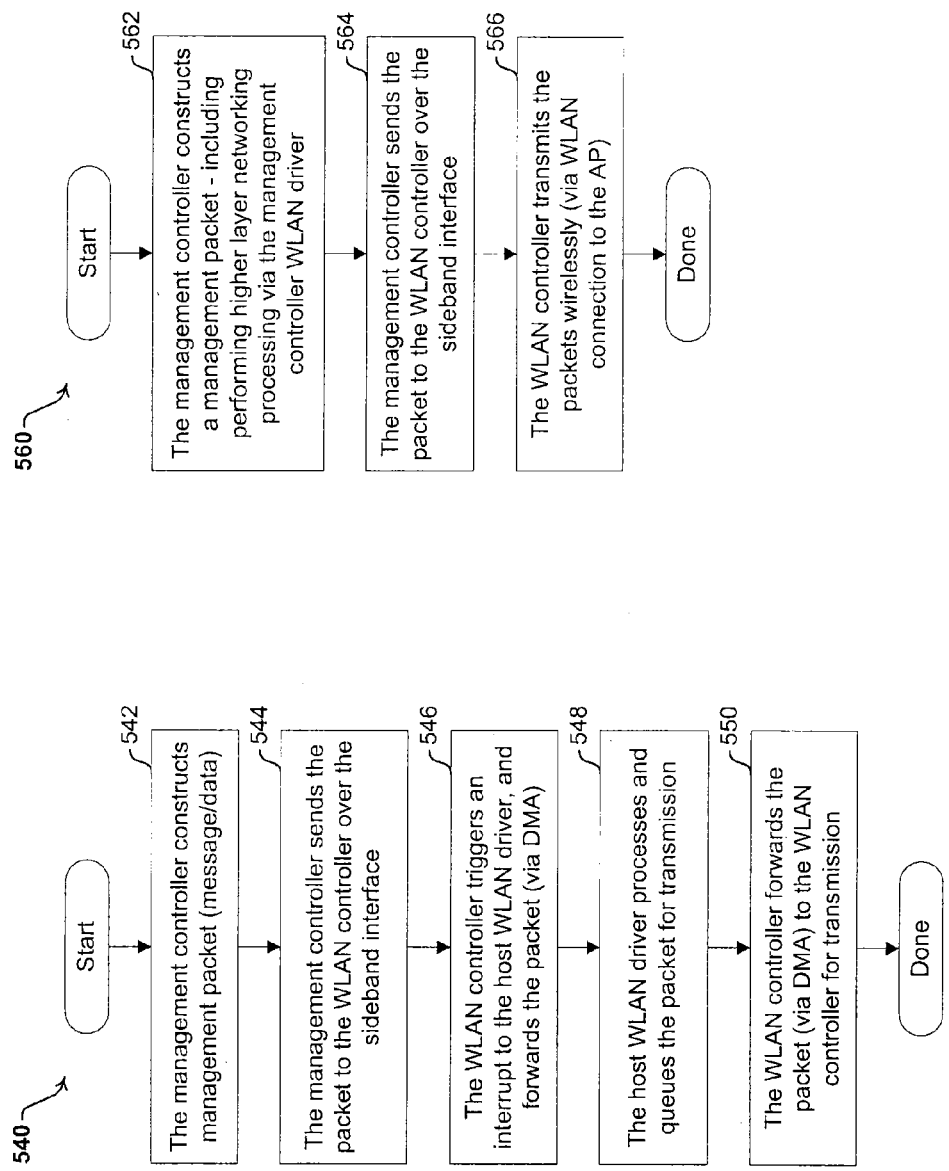

METHOD AND SYSTEM FOR SIDEBAND COMMUNICATION ARCHITECTURE FOR SUPPORTING MANAGEABILITY OVER WIRELESS LAN (WLAN)

CROSS-REFERENCE TO RELATED APPLICATIONS/INCORPORATION BY REFERENCE

The present divisional application claims the benefit of priority under 35 U.S.C. §120 to application Ser. No. 13/084,247, filed on Apr. 11, 2011, which makes reference to and claims priority to U.S. Provisional Application Ser. No. 61/349,016, filed on May 27, 2010. The entire contents of all of the above-listed documents are incorporated herein by reference.

CLAIM OF PRIORITY

This patent application makes reference to, claims priority to and claims benefit from U.S. Provisional Application Ser. No. 61/349,016 which was filed on May 27, 2010.

The above stated application is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to networking. More specifically, certain embodiments of the invention relate to a method and system for sideband communication architecture for supporting manageability over wireless LAN (WLAN).

BACKGROUND OF THE INVENTION

Network devices may communicate using wireless and/or wired connection, and be utilized to receive inputs, store and process data, and provide outputs for various applications. Network devices may comprise, for example, personal computers (PCs), laptops, servers, workstations, smart phones or other similar handheld mobile devices. A network device may comprise a network interface controller (NIC), which may be coupled internally (i.e. integrated into) or externally to the computer system. The NIC may be utilized in network access operations, to enable sending and/or receiving data, in the form of network packets, via wired and/or wireless connections.

Information Technology (IT) management may require performing remote management operations of remote systems to perform inventory and/or to determine whether remote systems are up-to-date. For example, management devices and/or consoles may perform such operations as discovering and/or navigating management resources in a network, manipulating and/or administrating management resources, requesting and/or controlling subscribing and/or unsubscribing operations, and executing and/or specific management methods and/or procedures. Management devices and/or consoles may communicate with devices in a network to ensure availability of remote systems, to validate that systems may be up-to-date, and/or to perform any security patch updates that may be necessary.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for sideband communication architecture for supporting manageability over wireless LAN (WLAN), substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 5C is a flow chart that illustrates exemplary steps corresponding to the transmit path during host-assisted handling of management traffic in a network device that incorporates sideband communication between wireless controller and management controller, in accordance with an embodiment of the invention.

FIG. 5D is a flow chart that illustrates exemplary steps corresponding to the transmit path during host-independent handling of management traffic in a network device that incorporates sideband communication between wireless controller and management controller, in accordance with an embodiment of the invention.

DETAILED DESCRIPTION OF THE INVENTION

Certain embodiments of the invention may be found in a method and system for sideband communication architecture for supporting manageability over wireless LAN (WLAN). In various embodiments of the invention, a management controller in a network device may handle management traffic communicated wirelessly via a wireless network controller of the network devices, and may perform and/or support management operations based on the handled wireless management traffic. The management controller may be operable to perform the management operations and/or to support wireless communication of the management traffic independent of operations of the network device. The management controller may be integrated into a network controller in the network device. The management traffic may comprise out-of-band (OOB) management related traffic. A direct interface may be established between the management controller and the wireless network controller, to support direct sideband communication between the management controller and the wireless network controller. In this regard, at least a portion of the wireless management traffic may be communicated between the management controller and the wireless network controller via the sideband interface. The sideband interface may incorporate and/or be based on Network Controller Sideband Interface (NC-SI) and/or the Secure Digital Input Output (SDIO) interface.

The wireless traffic communicated via the wireless network controller may be routed via a host subsystem in the network device when the host subsystem is available, wherein the routing may comprise filtering inbound packets to determine if they comprise management traffic, and forwarding inbound management traffic received via the wireless network controller back to the wireless network controller for communication to the management controller. Outbound traffic may be forwarded to the host subsystem from the wireless network controller, for additional networking related processing before being forwarded back to the wireless network controller, which may then communicated the outbound traffic wirelessly via one or more wireless connections, such as WLAN based connections. The management controller may configure the wireless network controller to provide direct pass-through routing of communicated network traffic to and/or from the management controller, via the sideband interface, when the host subsystem in the network device is not available. The management controller may control operations of the wireless network controller. In this regard, the management controller may comprise an embedded wireless controller driver for driving and/or controlling operations of the wireless network controller, such as when the host subsystem is not available.

Figure 1:
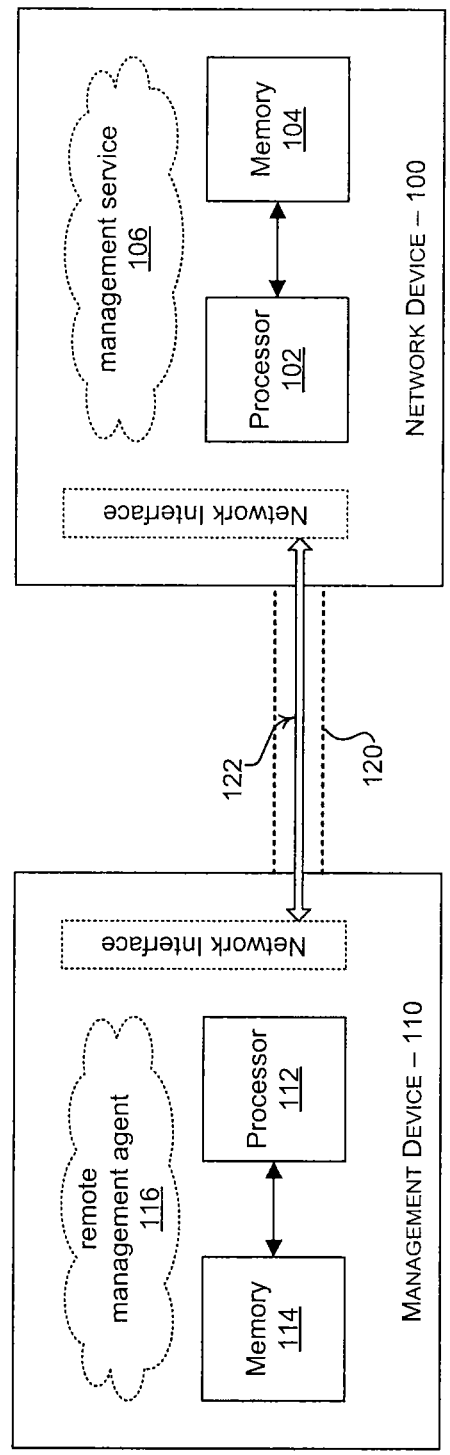
FIG. 1 is a block diagram that illustrates an exemplary communication system for supporting management operations, which may be utilized in accordance with an embodiment of the invention.

FIG. 1 is a block diagram that illustrates an exemplary communication system for supporting management operations, which may be utilized in accordance with an embodiment of the invention. Referring to FIG. 1, there is shown a network device 100 and a management device 110, which may communicate via a network link 120. Also shown in FIG. 1 are processors 102 and 112, memories 104 and 114, a management service 106, a remote management agent 116, and a management connection 122.

The processor 102 may comprise suitable logic, circuitry, interfaces, and/or code for control and/or manage operations of the network device 100, and/or performing tasks and/or applications therein, which may comprise management related operations. In this regard, the processor 102 may be operable to configure and/or control operations of various components and/or subsystems of the network device 102, by generating, for example, control signals. The processor 102 may also control data transfers within the network device 100. The invention may not be limited to a specific processor, but may comprise for example, a general purpose processor (CPU), a specialized processor, or any combination of suitable hardware, firmware, software and/or code. The processor 112 may be similar to the processor 102, and may be operable to perform substantially similar functions in the management device 110.

Each of the memories 104 and 114 may comprise suitable logic, circuitry, interfaces, and/or code that may enable permanent and/or non-permanent storage and fetch of data and/or code, such as during management related operations for example. In this regard, each of the memories 104 and 114 may comprise different memory technologies, including, for example, read-only memory (ROM), random access memory (RAM), Flash memory, and/or any combinations thereof.

The management device 110 may comprise suitable logic, circuitry, interfaces, and/or code for receiving, transmitting, and/or processing of network traffic, to facilitate network access operations in conjunction with applications or tasks performed in the management device 110 and/or based on user interactions with the management device 110. The management device 110 may comprise the processor 112 and the memory 114 for example. In an exemplary aspect of the invention, the management device 110 may be operable to support and/or participate in management operations, based on one or more management standards and/or protocols. In this regard, the management device 110 may be utilized by, for example, Information Technology (IT) operators and/or network administrators to manage and/or control a plurality of network devices, such as the network device 100 for example. Exemplary management operations may comprise discovering and/or navigating resources in a managed network, manipulating and/or administrating managed resources, ensuring availability of remote systems and/or devices, validating that the systems and/or devices (or applications therein) may be up-to-date, requesting and/or controlling subscribing and/or unsubscribing operations, performing security patch updates. Accordingly, the management device 110 may perform management operations, via the remote management agent 116 for example, wherein the management device 110 may utilize a network interface to exchange management related messages and/or information with the network 100 via the management connection 122, which may be established over network link 120.

In an exemplary aspect of the invention, the management device 110 may comprise a dedicated management component, such as the remote management agent 116 for example, to perform management operations based on one or more management standards and/or protocols. In this regard, the remote management agent 116 may comprise suitable logic, circuitry, interfaces, and/or code for performing management operations based on supported management standards and/or protocols. Exemplary management standards and/or protocols may comprise Distributed Management Task Force (DMTF) based Web Service Management (WS-Management) and/or Alert Standard Format (ASF) related protocols. The remote management agent 116 may comprise a logical and/or software entity that may be integrated, for example, within an OS running in the management device 110, using the processor 112 and/or the memory 114 for example. The remote management agent 116 may also comprise logical, software, and/or hardware based component that may be integrated within a network interface controller (NIC) which may be integrated into the management device 110 for enabling network communications. The remote management agent 116 may also comprise dedicated management sub-system within the management device 110, such as a management controller for example.

The network device 100 may comprise suitable logic, circuitry, interfaces, and/or code for receiving, transmitting, and/or processing of network traffic, to facilitate network access operations in conjunction with applications or tasks performed in the network device 100 and/or based on user interactions with the network device 100. The network device 100 may comprise the processor 102 and the memory 104 for example. In this regard, the network device 100 may comprise a personal computer (PC), a server, a mainframe, a network router or switch, a network printer, and/or a dedicated network storage device. In an exemplary aspect of the invention, the network device 100 may be operable to support and/or participate in management operations, in conjunction with one or more management devices, such as the management device 110 for example. In this regard, the network device 100 may support and/or provide various management services and/or functions, via the management service 106 for example, wherein the management device 110 may utilize a network interface to exchange management related messages and/or information with management device 100 via the management connection 122 for example.

In an exemplary aspect of the invention, the network device 100 may comprise a dedicated management component, such as the management service 106 for example, to perform and/or support management operations based on one or more supported management standards and/or protocols. In this regard, the management service 106 may comprise suitable logic, circuitry, interfaces, and/or code for performing management operations based on supported management standards and/or protocols, such as WS-Management and/or ASF related protocols related protocols for example. The management service 106 may comprise a logical and/or software entity that may be integrated, for example, within an OS running in the network device 100, using the processor 102 and/or the memory 104 for example. The management service 106 may also comprise logical, software, and/or hardware based component that may be integrated within a network interface controller (NIC), which may be integrated into the network device 100 to enable network communications. The management service 106 may also comprise dedicated management sub-system within the network device 100, such as a management controller for example.

The network link 120 may comprise a medium, and/or corresponding network interfaces within the management device 110 and the network device 100, for exchanging data and/or messages between the management device 110 and the network device 100. The network link 120 may comprise, for example, an Ethernet (IEEE 802.3) link, which may enable the management device 110 and/or the network device 100 to exchange data and/or messages via Ethernet packets transmitted and/or received via one or more wired and/or wireless connections. In an exemplary aspect of the invention, messages and/or data pertaining to specific operations, such as management operation, may be exchanged using network packets communicated via the network link 120. For example, during management operations, the network link 120 may be utilized by the management device 110 and network device 100 to establish management connection 122, to enable exchanging WS-Management and/or ASF protocol based messages.

In operation, the network device 100 and the management device 110 may communicate via the network link 104. In this regard, the network device 100 and the management device 110 may exchange messages and/or data pertaining to applications and/or tasks which may be performed collaboratively by the devices. For example, the network device 100 and the management device 110 may exchange messages and/or data pertaining to management operations, performed in the context of managing network device 100 via the management device 110. In this regard, the management device 110 may be utilized, by a network administrator for example, to manage a plurality of network devices, such as the network device 100. For example, the management device 110 may utilize the management connection 122 to communicate with the network device 100, to perform, request, and/or trigger various management operations, functions, and/or services in the network device 100. In this regard, the management connection 122 may support exchanging management related messages based on one or more standards-based management protocols, to enable performing management operations between the management device 110 and the network device 100. For example, the remote management agent 116 and/or the management service 106 may support use of ASF and/or WS-management based messages, transmitted and/or received via the management connection 122, within Ethernet packets for example, during management operations between the management device 110 and the network device 100. The Alert Standard Format (ASF) protocol may be used in first generation out-of-band (OOB) management systems. In this regard, the ASF functionality may be implemented using User Datagram Protocol (UDP) based stack, to facilitate communication between management devices and network devices. Accordingly, devices supporting and/or using ASF functionality and/or interfaces may perform and/or participate in management operations using ASF messages, which may be transported via UDP based connections.

The Web Service Management (WS-Management) protocol has been developed as a next generation management protocol. The WS-Management protocol is based on the Simple Object Access Protocol (SOAP), which utilizes XML based messaging and HTTP(S) sessions, and may utilize TCP based transport connectivity for communications between management devices and network devices. Use of SOAP over HTTP(S) may require supporting HTTP/TLS/TCP stack implementation in the management/network devices, which may, however, ensure improved security, reliability, and OS-independent operations. Furthermore, the DMTF has defined a management data model called Common Information Model (CIM), which may be utilized in conjunction with the WS-Management protocol during management operations. The CIM based data model may provide object oriented representation of management data, managed resources, and/or management relationships, which may be accessed and/or configured using WS-Management protocol based messaging. Accordingly, devices supporting and/or using WS-Management, and/or CIM based functionality and/or interfaces, may perform and/or participate in out-of-band (OOB) management operations using WS-Management based messaging, which may be transported via TCP connections. For example, the management device 110 may utilize WS-Management based messaging to during management of the network device 100 in instances where the network device 100 may comprise Intelligent Platform Management Interface (IPMI) and/or ASF based internal communications within the components of the network device 100.

In an exemplary aspect of the invention, management operations related communications, such as OOB management operations related interactions, may be performed utilizing wireless connections. In this regard, the network device 100 may utilize wireless links when exchanging management related messages with the management device 102 via the management connection 122. Accordingly, in various embodiments of the invention, the network device 100 may be configured to, and/or its architecture may be implemented and/or modified to support out-of-band (OOB) management related communications over wireless connection. Furthermore, handling of out-of-band (OOB) management related communications over wireless connection may be performed in the network device 100 independent of host environment, and/or operations thereof, in the network device 100, as described in more details in, for example, FIG. 2.

Figure 2:
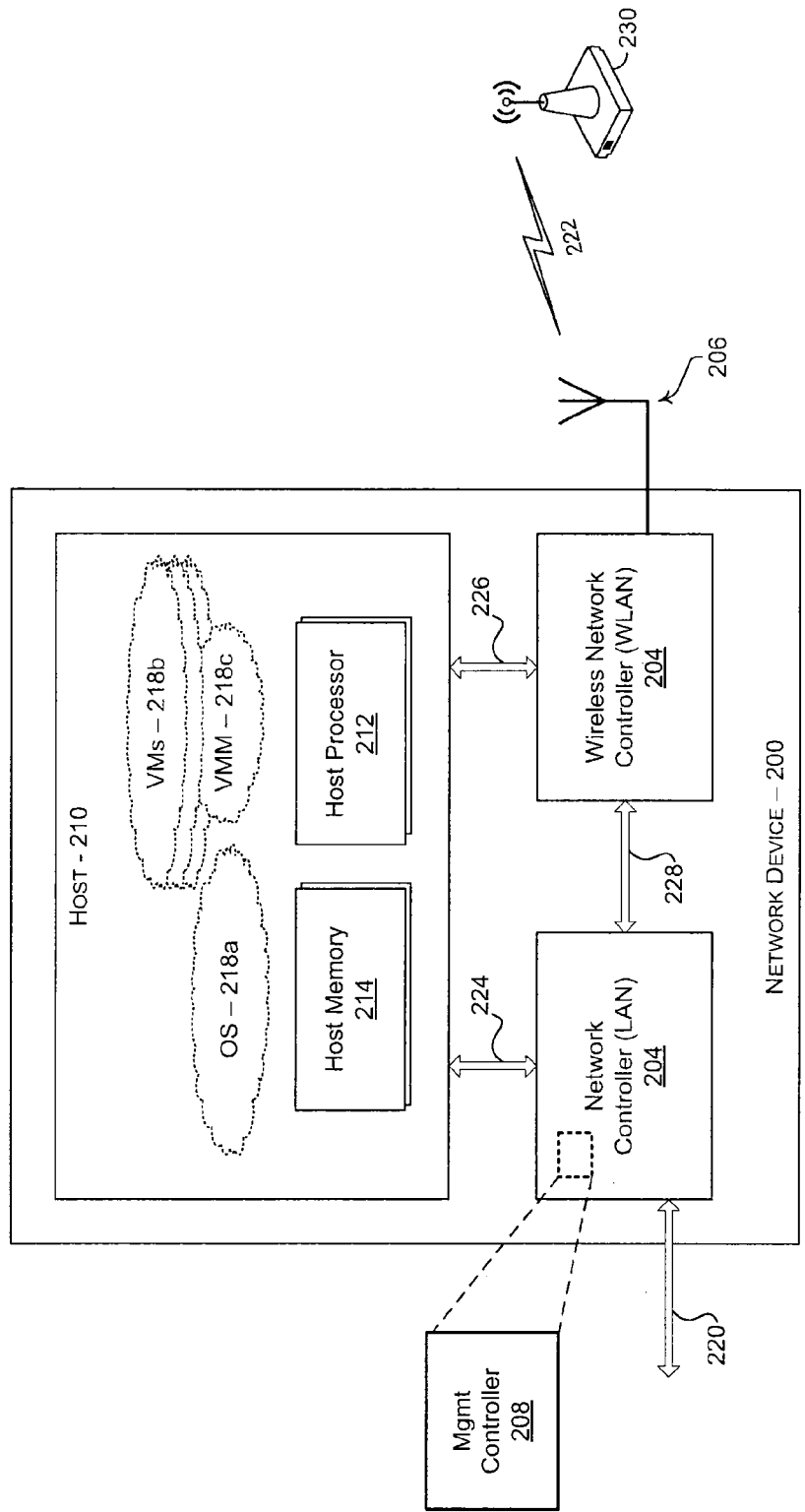
FIG. 2 is a block diagram illustrating an exemplary network device that supports use of wireless communication during out-of-band (OOB) management, in accordance with an embodiment of the invention.

FIG. 2 is a block diagram illustrating an exemplary network device that supports use of wireless communication during out-of-band (OOB) management, in accordance with an embodiment of the invention. Referring to FIG. 2, there is shown a network device 200.

The network device 200 may comprise suitable logic, circuitry, interfaces, and/or code that may enable reception, transmission, and/or processing of network traffic. The network device 200 may also be operable to support participating in various networking related operations, such as management operations for example. The network device may comprise, for example, a network controller 202, a wireless network controller 204, a management controller 208, and a host 210. Exemplary network devices may comprise personal computers (PCs), laptops, servers, mainframes, network routers, bridges, and/or switches, and/or other similar communication devices. The network device 200 may correspond to, for example, the network device 100 of FIG. 1.

The network controller 202 may comprise suitable logic, circuitry, interfaces, and/or code that may handle network traffic, such as network traffic 220, which may be received and/or transmitted by the network device 200 via wired connections, based on wired based standards, such as wired Ethernet (IEEE 802.3) based links. In this regard, the network controller 202 may comprise a network interface controller (NIC) for use in conjunction with local area network (LAN) access.

The wireless network controller 204 may comprise suitable logic, circuitry, interfaces, and/or code that may handle wireless communication of network traffic, such as wireless network traffic 222, which may be received and/or transmitted via wireless connections, using one or more antennas 206. In this regard, the wireless network controller 204 may enable reception and/or transmission of network packets by the network device 200 wirelessly, based on one or more wireless protocols, such as IEEE 802.11 (WLAN) based protocols. Accordingly, the network controller 202 may comprise a wireless network interface controller (WNIC) for use in conjunction with wireless local area network (WLAN) access, which may be obtained via the WLAN access point 230.

The management controller 208 may comprise suitable logic, circuitry, interfaces, and/or code that may be operable to perform and/or provide management operations and/or services in the network device 200, which may be based on one or more management protocols such as the WS-Management for example, and/or to support management related communications with other remote management entities, such as the management device 102. The management controller 204 may be integrated into the network controller 202, with hardware and/or software (or firmware) resources and/or components thereof being utilized in performing various operations descried with respect to the management controller 204. However, the invention need not be so limited. Accordingly, the management controller 204 may be implemented as a separate and/or dedicated component in the network device 200. The management controller 208 may be operable to process management traffic, which may be received and/or transmitted via the network controller 202 for example, as part of the network traffic 220 during management related exchanges with, for example, such as the management device 102. Furthermore, to facilitate and/or support management operations performed in and/or by the network device, the management controller 208 may be operable to interact with other components and/or subsystems in the network device 200, such as the host 210, and/or components thereof, to enable performing required configuration and/or control functions, and/or to obtain feedback and/or status information as needed to perform supported management operations and/or services.

The host 210 may correspond to a plurality of components and/or subsystems in the network device 200, which may be utilized in running and/or executing processes, tasks, and/or applications that may be provided by and/or performed in the network device 200. In this regard, the host 210 may comprise one or more host processors 212, one or more memories 214, and/or additional components or resources such as a Basic Input/Output System (BIOS), and a plurality of dedicated hardware and/or firmware components, such as, for example, one or more hard disk drives, one or more NVRAM elements, chipsets, sensors, video or graphics controllers (cards), audio controllers (cards). The host 210 may also comprise an operating system (OS) 218a, and/or any applications and/or processes running therein. The OS 218a may be run via the host processor 212, for example. Furthermore, in instances when the network device 200 is implemented as virtualization based platform, the host 210 may comprise one or more virtual machines (VMs) 218b and/or a virtual machine monitor or hypervisor (VMM) 218c.

In an exemplary aspect of the invention, a host environment, corresponding to the host 210 and/or various components thereof, which may run in the network device 200, may not be available in certain scenarios. For example, during power up sequences, certain code, which may be stored in read-only memory (ROM) in the host memory 214 for example, may be executed when network device 200 is powered up and/or reset. Such code may be used to identify, test, and initialize ("boot up") certain components of the network device 200. Therefore, prior to completion of system boot up, the network device 200 may have limited functionality, and the host environment may not be running prior to completion of boot up, when the OS 218a, the VMs 218b, and/or the VMM 218c are not yet available (i.e. pre-OS). The host environment may also be unavailable in certain scenarios after the completion of system boot up, when the OS 218*a*, the VMs 218*b*, and/or the VMM 218*c* become unavailable (i.e. post-OS), such as when errors occur causing OS or VM crashes, and/or due to transitions to certain states, such as low power states (hibernate or sleep states) for example.

In operation, the network device 200 may receive, transmit, and/or process the network packets, via wired and/or wireless connections. In this regard, the network controller 202 may be operable to receive, transmit, and/or process network traffic 220, which may comprise network packets received and/or transmitted via one or more wired network connections, such as via wired Ethernet (IEEE 802.3) based connections. The wireless network controller 204 may be operable to handle communication of the wireless traffic 222. In this regard, wireless network controller 204 may be operable to receive, transmit, and/or process packets communicated wirelessly, using one or more antennas 206, over wireless connections, such as WLAN (IEEE 802.11) based connections, between the network device 200 and the WLAN access point 230 for example.

Network packets, which may be communicated via the network controller 202 and/or via the wireless network controller 204, may correspond to host traffic, which may comprise wired host traffic 224 and/or wireless host traffic 226, respectively. In this regard, host traffic may comprise data and/or messages transmitted and/or received by the host 210, and/or applications or processes running therein. For example, the host traffic 224 and/or 226 may comprise data transmitted and/or received by web browsing applications running in the network device 200. The communicated network packets may also correspond to management traffic. The management traffic may comprise data and/or messages transmitted and/or received by the network device 200 during management operations, which may be handed by the management controller 208. For example, the management traffic may comprise WS-Management based messages communicated to and/or from the network device 200, to support WS-Management services and/or applications performed therein.

The management controller 208 may be operable to perform management operations in the network device 200, and/or to receive, transmit, and/or process the management traffic. In this regard, the management controller 208 may perform, control, and/or support management services and/or operations provided by and/or performed in the network device 200, and/or may perform necessary interactions with remote management entities, such as the management device 102 of FIG. 1, during these management operations and/or services. The management controller 208 may support in-band and/or out-of-band management operations. During management related operations, the management controller 208 may interact with the host 210, and/or components thereof, to enable necessary configuration and/or control operations based on received management messages. The management controller 208 may also interact with the host 210, and/or components thereof to query, log, and/or store data pertaining to events and/or errors occurring therein, and/or to determine conditions thereof. The interactions between the management controller 208 and the host 210, and/or components thereof, may be performed indirectly, via the network controller 202 for example. Alternatively, the management controller 208 may be operable to interact directly with the host 210, and/or components thereof, over existing and/or available internal communication subsystems, which may comprise a System Management Bus (SMBus) and/or Peripheral Component Interconnect Express (PCI-E) based buses and/or interconnects within the network device 200.

In an exemplary aspect of the invention, the management controller 208 may support out-of-band (OOB) management operations, and/or may be operable to implement OOB related features and/or may perform OOB related functions. As the complexity of platforms and enterprise environments grows, the management of enterprise platforms is becoming increasingly important. The manageability features are becoming platform features and differentiators. Accordingly, platforms, such as the network device 200 for example, may be managed in one or both of an in-band and/or out-of-band environments. In this regard, in in-band management environments, management operations may be performed with the support of hardware components that may be critical to and used by the operating system by host environment, and/or components there of such as the operating system running therein. In out-of-band (OOB) management environment, management operations may be performed utilizing resources and components that may be run independent of the host environment, or the operating system running therein. These resources, such as by utilizing the management controller 208, are dedicated to platform management and may allow management of platform hardware components independent of the availability of host environment running in the managed systems. Accordingly, OOB management may enable remote diagnostics, repair, provisioning, and reimaging of managed system even when host environments therein may not be available, due to unavailability of OS for example. Exemplary OOB management features and/or functions may comprise system inventory, system monitoring and control, power control, boot control, user account management, indications, bios management, opaque management data, text console redirection, USB redirection, firmware updates, event logging, audit log for management operations, and/or provisioning.

The system inventory feature may enable hardware and software inventory of a system in the OOB environment. The inventory information may include details of physical components, chassis, cards, processor, cache representation and configuration, system memory representation, fan status and component representation, power supply status and component representation, and/or software or firmware version information. This inventory information may allow a remote management client to discover capabilities of the system as well as the states of different system components. This information may be able to help in diagnosing and repairing the system. The system monitoring and control feature may allow a system to be monitored in the OOB environment by monitoring and controlling sensors status and information. The states of different system components including the physical components may provide a way to monitor and control the system.

The power control feature may allow a remote management console or client to turn on, turn off or reset a system in the OOB environment. The power state changes that may be supported are based on how the platform is configured for the remote power control. The power state changes may be performed continuously and/or discretely. The power state changes may allow a remote administrator to reboot the system, shutdown the system, and/or turn on the system, for example. These power control capabilities may be used during the remote diagnosis and repair of the system. The boot control feature may allow the boot configurations of the system to be visible and modifiable by a remote client using the OOB environment. One or both of persistent and/or one-time boot configurations may be supported. The remote management client may use boot setting data for different boot configurations. The remote boot control feature may be useful for reimaging and/or repairing the system.

The BIOS management feature may allow remote configuration and control of the system BIOS, using the management controller 208 for example. In this regard, the management controller 208 may act as a cache of the BIOS settings and attributes. The BIOS attributes and settings may be visible to the remote management client and the BIOS attribute changes may be made programmatically. The opaque management data feature may provide a persistent nonvolatile memory space where the users or applications may store information such as, software version numbers, asset tag, system ID, logs and/or software inventory. One or more IT technicians or administrators may use a remote management console or a local software agent to upload the information in this memory to assist in software-asset inventories, application, OS migrations, and/or problem resolution. The opaque management data feature may help to minimize the reliance on local software agents to store and retrieve data to help prevent accidental data loss. The access to the opaque management data feature may be provided in both the OOB and in-band environments. The firmware update feature may have the ability to update firmware using either in-band or OOB environment, and may allow a management console to update management firmware, boot code, and/or other network controller firmware components, for example. The firmware update feature may allow an administrator or user to push patches or fixes to the firmware as well as update the firmware with new features, for example. The provisioning feature may allow a bare-metal system to be provisioned as a managed system.

The user account management is a term that may be used to refer to the manageability of user accounts, for example. The user account management feature may provide one or more of the following aspects of account management: creating and/or deleting an account, changing the state of an account, for example, disable, enable, enabled but offline, modifying a user name, organization name, and/or password of an account, and/or associating an account or identity with specific roles tied to specific privileges, for example.

The indications feature may enable the communication of platform event information to the remote client. The client may be operable to use indications for monitoring and/or diagnosing a system. One or both of alert indications and/or lifecycle indications may be supported. The alert indications feature may provide the information about the alerts and/or events that may be generated by the platform and the lifecycle indications may provide information about the lifecycle changes in the managed elements. The service may use a push model to communicate indications to the client. The client may be operable to subscribe and/or unsubscribe to one or more sub-sets of indications. Notwithstanding, this feature may also work with other in-band indication services running on the platform, for example. The event logging feature may provide a log of alert indications related information. This log may be read and cleared. The event logging feature may allow an administrator to have visibility into the events that happened inside the system, for example. The event logging feature may enhance the ability to monitor and diagnose a system. The audit log for management operations feature may enhance the security of the manageability solution. By accessing an audit log of management operations, an auditor in an enterprise may be able to trace a set of critical management operations performed by a set of users. The audit log for management operations feature may enable investigating malicious attacks and security breaches within a system or an enterprise.

The text console redirection feature may have the ability to remotely monitor and administrate a system without local keyboard, mouse, and video monitor for handling a scenario when the system fails to boot or OS fails to load. The text console redirection feature may allow the serial console I/O to be redirected to a remote management console. The USB redirection feature may have the ability to remotely boot a system when the local disk is corrupted or the system fails to boot. The USB-redirected devices may appear as local USB devices to the system firmware and OS. But, the redirection of the control and/or data to and/or from the USB devices may be handled transparently. The USB redirection service may provide the service to the management console to control the USB redirection sessions. The actual data transfer related to the USB redirection may be performed using a protocol, for example, HTTP.

The provisioning feature may also support the ability to re-provision the system in the case the system has been compromised or repurposed. The provisioning process may include discovery, management access point (MAP) configuration, management service set up or configuration, and/or credential provisioning.

Figure 3A:
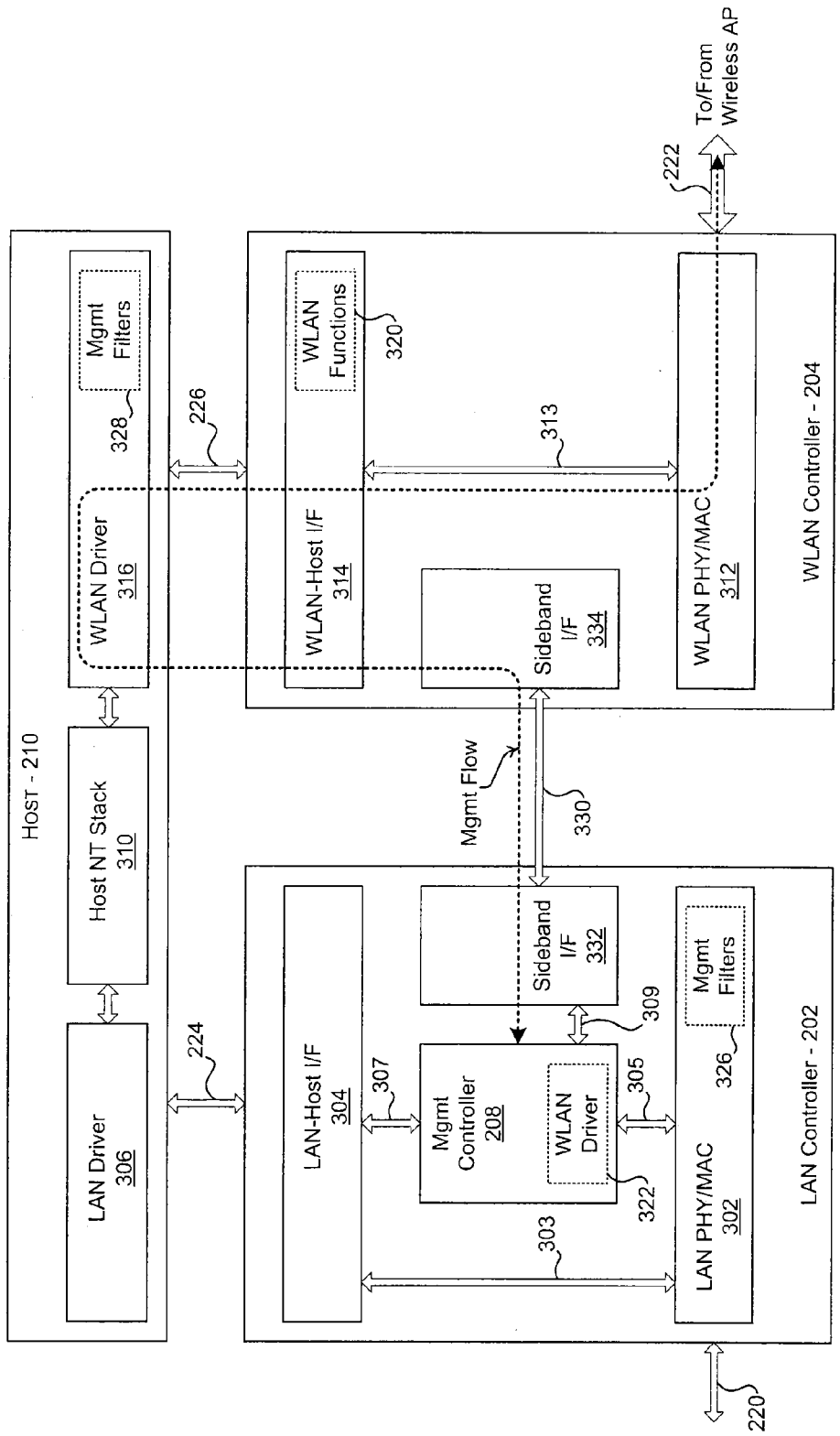
FIG. 3A is a block diagram illustrating exemplary handling of management traffic in a network device, which supports sideband communications between a management controller and a wireless network controller, when a host environment in the network device is available, in accordance with an embodiment of the invention.

FIG. 3A is a block diagram illustrating exemplary handling of management traffic in a network device, which supports sideband communications between a management controller and a wireless network controller, when a host environment in the network device is available, in accordance with an embodiment of the invention. Referring to FIG. 3A, there is shown host 210, the wireless network controller 204, and the network controller 202, which comprises the management controller 208, of the network device 200.

In the embodiment shown in FIG. 3A, the network controller 202 may comprise LAN physical layer/media access control layer (PHY/MAC) processing block 302, LAN-host interface 304, and LAN sideband interface module 332. The wireless network controller 204 may comprise a WLAN PHY/MAC processing block 312, a WLAN-host interface 314, and a WLAN sideband interface module 334.

The LAN PHY/MAC processing block 302 may comprise suitable logic, circuitry, code, and/or interfaces for performing at least a portion of PHY and/or MAC processing within the network controller 202 in accordance with one or more types of supported wired connections. In this regard, the LAN PHY/MAC processing block 302 may be operable to perform physical transmission and/or reception of bit streams, which may correspond to transmitted and/or received network packets, via physical, wired based links based on one or more networking standards, such as wired Ethernet (IEEE 802.3) physical layer interface for example. The LAN PHY/MAC processing block 302 may also be operable to perform MAC processing, such as addressing and/or channel access management related operations, which may be based on one or more specific network connectivity standards. For example, in instances where the network traffic 202 may be transmitted and/or received via wired Ethernet (IEEE 802.3) connections, the LAN PHY/MAC processing block 302 may perform MAC operations based on the Carrier Sense Multiple Access With Collision Detection (CSMA/CD) protocol.

To support management related operations, the network controller 202 may comprise a management filter 326, which may be incorporated into the LAN PHY/MAC processing block 302 for example. In this regard, the management filter 326 may comprise suitable logic, circuitry, code, and/or interfaces that may enable examining network packets handled in the network controller 202, to determine whether these packets comprise management related messaging and/or data. In the case of inbound network packets, the management filter 326 may be operable to route these packets to the management controller 208 for further handling of management operations communicated in the management messages.

The LAN-host interface 304 may comprise suitable logic, circuitry, code, and/or interfaces that may enable interfacing and/or communication between the network controller 202 and the host 210, or components thereof. The LAN-host interface 304 may support physical transfer of data between the network controller 202 and the host 210 utilizing one or more existing and/or available inter-system buses and/or interconnects. For example, the LAN-host interface 304 may support use of Peripheral Component Interconnect Express (PCI-E) bus to communicate host traffic 224 between the network controller 202 and the host 210.

The LAN sideband interface module 332 may comprise suitable logic, circuitry, code, and/or interfaces for supporting sideband interfacing and/or communication by the network controller 202. In this regard, the sideband interfacing may be utilized in communicating and/or interfacing with other components, such as components that may not be part of the host 210, in the network device 200, and/or may enable doing so in host-independent manner, for example in instances where the OS (or VMs) running in the host 210 may not be available, such as in pre-OS or post-OS scenarios. For example, the LAN sideband interface module 332 may support establishing and/or configuring physical connectivity to the wireless network controller 204, and/or transfer of data and/or messaging to and/or from the wireless network controller 204, based on one or more supported sideband interfaces and/or related protocols. In this regard, sideband communication and/or interactions between the network controller 202 and the wireless network controller 204 may be performed based on the network controller sideband interface (NC-SI) and/or Secure Digital Input Output (SDIO), to enable supporting management related interactions for example.

The WLAN PHY/MAC processing block 312, a WLAN-host interface 314, and a WLAN sideband interface module 334 may be substantially similar to the LAN PHY/MAC processing block 302, a WLAN-host interface 304, and a LAN sideband interface module 332, respectively. In this regard, the WLAN PHY/MAC processing block 312 may comprise suitable logic, circuitry, code, and/or interfaces for performing at least a portion of PHY and/or MAC processing within the wireless network controller 204 in accordance with one or more types of supported wireless protocols and/or standards, such as WLAN (IEEE 802.11). For example, the WLAN PHY/MAC processing block 312 may be operable to perform wireless transmission and/or reception of bit streams, which may correspond to transmitted and/or received network packets, in the form of electromagnetic waves within frequency bands corresponding to supported and/or utilized wireless interfaces. The WLAN PHY/MAC processing block 312 may also be operable to perform at least a portion of MAC processing associated with supported wireless interfaces. For example, WLAN PHY/MAC processing block 312 may be operable to perform at least a portion of MAC processing to enable WLAN based communications.

The WLAN-host interface 314 may comprise suitable logic, circuitry, code, and/or interfaces that may enable interfacing and/or communication between the wireless network controller 204 and the host 210, or components thereof, over one or more existing and/or available inter-system buses and/or interconnects. For example, the WLAN-host interface 314 may support use of Peripheral Component Interconnect Express (PCI-E) bus to communicate host traffic 226 between the wireless network controller 204 and the host 210.

The WLAN sideband interface module 334 may comprise suitable logic, circuitry, code, and/or interfaces for supporting sideband interfacing and/or communication by the wireless network controller 204, substantially as described with regard to the LAN sideband interface module 332. In this regard, the WLAN sideband interface module 334 may support establishing and/or configuring physical connectivity to the network controller 202, and/or transfer of data and/or messaging based thereon, in accordance with one or more supported sideband interfaces and/or related protocols, such as the network controller sideband interface (NC-SI) and/or Secure Digital Input Output (SDIO). Accordingly, the WLAN sideband interface module 334 and the LAN sideband interface module 332 may be utilized collaboratively to enable supporting management related interactions between the wireless network controller 204 and the management controller 208.

In an exemplary aspect of the invention, the wireless network controller 204 may be operable to directly handle certain functions pertaining to supported wireless protocols. For example, the wireless network controller 204 may comprise a WLAN functions module 320, which may be incorporated into the WLAN-host interface 314 for example, and may be operable to perform and/or support various WLAN connection and/or session establishment related functions directly, without requiring participation and/or control by the host 210 or components thereof. Exemplary functions that may be performed via the WLAN functions modules 320 may comprise detecting access points (APs), communicating with detected APs, authenticating discovered APs, negotiating connection and/or session related parameters, and/or negotiating and/or setting proper access identifiers and security credentials.

In accordance with the embodiment shown in FIG. 3A, the host 210 may comprise one or more device drivers, and/or related functions, which may be utilized in operating and/or interacting with other components of the network device 200, such as the network controller 202 and/or the wireless network controller 204. For example, the host 210 may comprise LAN driver 306 and WLAN driver 316, which may be utilized in operating the network controller 202 and the wireless network controller 204, respectively. The host 210 may also comprise host networking stack 310, which may be utilized to support networking related processing in the host 210, such as handling various layer related processing based on the multi-layer OSI model. The LAN driver 306 may be operable to initialize, configure, control, and/or interact with the network controller 202. In this regard, the LAN driver 306 may enable forwarding to the network controller 202 data that may be transmitted thereby in network packets, and/or may enable receiving data that may extracted by the network device 200 from received network packets. The term 'data' may refer to the actual data being communicated, and/or any additional headers and/or footers pertaining to any encapsulation that is handled directly by the host 210, and/or components or applications thereof. For example, in instances where the network controller 202 handles only PHY and/or MAC processing, the data may also comprise headers/footers pertaining to remaining layers in the seven-layer OSI model, which may be added (for outbound packets) or removed (for inbound packets) utilizing the host networking stack 310.

The WLAN driver 316 may be similar to the LAN driver 306, and may be operable to initialize, configure, control, and/or interact with the wireless network controller 204 of the network device 200 for use of wireless connections. In this regard, the WLAN driver 316 may enable forwarding to the wireless network controller 204 data that may be transmitted wirelessly thereby, via network packets, and/or may enable receiving data that may extracted by the wireless network controller 204 from received network packets.

In an exemplary aspect of the invention, the management controller 208 may comprise a WLAN driver 322, which may be similar to the WLAN driver 316. In this regard, the WLAN driver 322 may be operable to perform at least a subset of function described with regard to the WLAN driver 316. The WLAN driver 322 may be utilized, for example, in instances where the host 210, and thus the WLAN driver 316, may not be available. Furthermore, the WLAN driver 322 may be configured to support use by and/or functions of the management controller 208.

In operation, the network controller 202 and/or the wireless network controller 204 may be enable reception and/or transmission of network packets communicated to and/or from the network device 200, and/or may provide at least a portion of handling and/or processing of the network packets. For example, the network controller 202 may be operable to receive, transmit, and/or process network traffic 220, which may comprise network packets received and/or transmitted via wired network connections, such as via wired Ethernet (IEEE 802.3) connections. In this regard, the LAN PHY/MAC processing block 302 may be operable to perform PHY and/or MAC related processing for received and/or transmitted network packets. In the receive, or inbound path, once PHY and/or MAC processing is complete, the partially processed packets, which may comprise payload data and headers and/or footers pertaining to remaining layers may be forwarded (303) to the LAN-host interface 304. The LAN-host interface 304 may be operable to forward the data, and/or partially processed packets, to the host 210 as part of host traffic 224. In this regard, the LAN-host interface 304 may utilize direct memory access (DMA) transfer for placing and/or copying data and/or partially processed packets into the host memory 214 of host 210, over PCI-E bus, for example. The host 210 may complete handling of the received packets, utilizing the LAN driver 306 and/or the host networking stack 310 for example, by removing and/or processing headers and/or footers, and/or extracting payload data carried therein. Furthermore, the management filter 326 may enable determining if inbound packets comprise management messaging, in which case the received packets may be forwarded (305) to the management controller 208.

In the transmit, or outbound path, host 210 may forward data destined for transmission, directly or within partially constructed frames or packets, such as for LAN transmission, to the LAN-host interface 304. In this regard, the host 210 may be operable to add, via the LAN driver 306 and/or the host networking stack 310, headers and/or footers pertaining to higher layers (L3 or higher) and/or protocols related thereto, such as TCP or UDP related headers for example, of the seven-layer OSI model for example. The LAN-host interface 304 may utilize DMA transfer for retrieving and/or copying the data and/or partially processed packets from the host memory 214 of host 210, over PCI-E bus, for example. The LAN-host interface 304 may forward the received data, or partial packets, to the LAN PHY/MAC processing block 302, to enable performing PHY and/or MAC processing thereon to facilitate transmission of corresponding Ethernet packets. The management controller 208 may also forward outbound management messaging and/or data to the LAN PHY/MAC processing block 302, which may perform necessary PHY and/or MAC processing thereon to facilitate transmission of corresponding Ethernet packets as part of the network traffic 220.

The wireless network controller 204 may be operable to receive, transmit, and/or process wireless network traffic 222, which may comprise network packets received and/or transmitted wirelessly, via the antennas 206 for example, over one or more wireless interfaces, such as over WLAN (IEEE 802.11) based interfaces for example. In this regard, the WLAN PHY/MAC processing block 312 may be operable to perform PHY and/or MAC related processing for received and/or transmitted wireless network packets. While the MAC processing may be performed completely within the network controller 202, MAC layer functions and/or operations are typically divided between the wireless network controller 204 and host 210, wherein the WLAN driver 316 may be configured to provide at least some MAC layer related functions and/or processing.

In the receive, or inbound path, after handling by the WLAN PHY/MAC processing block 312, partially processed packets, which may comprise payload data and headers and/or footers pertaining to remaining OSI layers, may be forwarded (313) to the WLAN-host interface 314. The WLAN-host interface 314 may then forwarded them to the host 210 as part of wireless host traffic 226. In this regard, the WLAN-host interface 314 may utilize DMA transfers in placing and/or copying the data and/or partially processed packets into the host memory 214 of host 210, over PCI-E bus, for example. The host 210 may then be operable to complete handling of received packets, via the WLAN driver 316 316 and/or the host networking stack 310 for example, which may remove and/or process remaining headers and/or footers, and/or extracting payload data. Because MAC layer processing may not be complete until the received packets are handled by the WLAN driver 316, determining whether received packets comprise inbound management messaging and/or data may be performed in the host 210, via the WLAN driver 316 for example. In this regard, the WLAN driver 316 may comprise a management filter 328, which may be similar to the management filter 326. In this regard, the management filter 328 may be operable to examine received network packets forwarded from the wireless network controller 204, to determine whether these packets comprise management related messaging and/or data.

In the transmit, or outbound path, the host 210 may forward to the WLAN-host interface 314 data that destined for WLAN transmission, and/or partially constructed frames or packets comprising that data and some additional information. In this regard, the host 210 may add, via the WLAN driver 316 and/or the host networking stack 310, headers and/or footers pertaining to higher layers of the OSI model for example. The WLAN driver 316 may also perform at least some of the MAC layer related functions and/or processing. The WLAN-host interface 314 may utilize DMA transfers in retrieving and/or copying the data and/or partially processed packets from the host memory 214 of host 210, over PCI-E bus, for example. The WLAN-host interface 314 may forward the received data, or partial packets, to the WLAN PHY/MAC processing block 312, to enable PHY and/or MAC processing thereon to facilitate transmission of corresponding wireless (WLAN) packets.

In various embodiments of the invention, sideband communication between the wireless network controller 204 and the network controller 202 may be utilized to support wireless communication of management traffic, and/or performing or handling of management operations based thereon. In this regard, the management operations may pertain to various out-of-band (OOB) management functions and/or features, substantially as described with regard to FIG. 2 for example. Sideband communication may comprise communication within a system, such as the network device 200, between components of the system, which may be utilized to support and/or enable such operations as management operations. In this regard, sideband communication may be performed in accordance with one or more particular sideband interfaces and/or protocols, such as network controller sideband interface (NC-SI) and/or Secure Digital Input Output (SDIO) for example. Sideband communications may typically be utilized between management controllers, such as management controller 208 and other particular components, such as the network controller 202 in instances where the management controller 208 may be implemented as separate component external to the network device 202.

For inbound management traffic, the management filter 328 of the WLAN driver 316 may determines that received network packet comprises management traffic, such as OOB related management packet. The WLAN driver 316 may queue or buffer the network packet. The WLAN driver 316 may then forward the received network packet to the wireless network controller 204, particularly to the LAN sideband interface module 334 of, over the host traffic 224, using DMA transfer for example. The WLAN driver 316 may also generate an interrupt to inform the management controller 208 that a management packet was received. The management controller 208 may request the management packet, using sideband communication, and the management packet may be forwarded between the wireless network controller 204 and the network controller 202, using sideband interface 330 for example, which may be established between and/or configured via the LAN sideband interface module 332 and WLAN sideband interface module 334. The management packet may be forwarded (309) from LAN sideband interface module 332 to the management controller 208, where it may be handled. In this regarding, handling of the received management packet may comprise performing particular OOB management functions based on the messages. The management controller 208 may utilize (307) the LAN-host interface 304 to interact with the host 210, to perform any required management related control and/or configuration operations and/or to obtain any requested events and/or logs related information for example.

For outbound management traffic, the management controller 208 may construct outbound management packet, which may respond to previously received management requests and/or may comprise management related information, such as events and/or logs related data. The management controller 208 may forward (309) the constructed management packet to the LAN sideband interface module 332. The constructed management packet may then be forwarded to the wireless network controller 204, via the sideband interface 330 between the LAN sideband interface module 332 and WLAN sideband interface module 334 for example. The LAN sideband interface module 334 may forward the outbound management packet to the host 210, via the LAN-host 314 for example, utilizing DMA transfers in placing and/or copying the outbound management packet network packet into host memory 214 for example. The LAN sideband interface module 334 may also generate an interrupt to the WLAN driver 316 regarding presence and/or readiness of the outbound management packet for transmittal. The WLAN driver 316 may process the outbound management packet, adding necessary headers and/or footers, for example, by utilizing the host networking stack 310. The WLAN driver 316 may also be operable to merge outbound host and management traffic within the same network packet(s). The resultant network packet may be queued, and/or may subsequently be forwarded to the wireless network controller 204 for transmittal as part of the wireless network traffic 202.

Figure 3B:
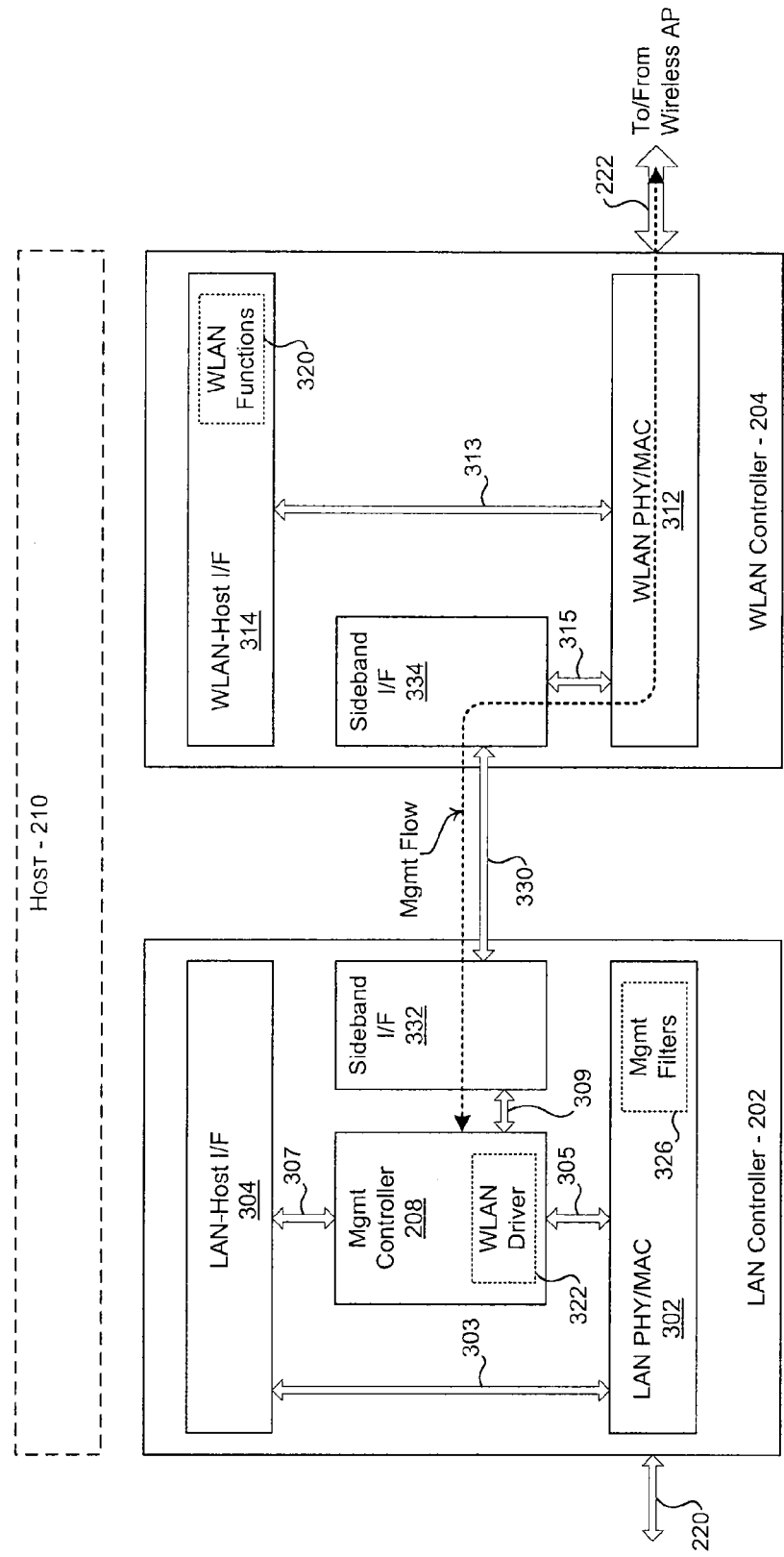
FIG. 3B is a block diagram illustrating exemplary handling of management traffic in a network device, which supports sideband communications between a management controller and a wireless network controller, when a host environment in the network device is unavailable, in accordance with an embodiment of the invention.

FIG. 3B is a block diagram illustrating exemplary handling of management traffic in a network device, which supports sideband communications between a management controller and a wireless network controller, when a host environment in the network device is unavailable, in accordance with an embodiment of the invention.

In operation, the network device 200 may support handling of management traffic, and/or performing management operations related thereto, even when host 210 may not be available. The management operations may pertain to various out-of-band (OOB) management functions and/or features, substantially as described with regard to FIG. 2 for example. In this regard, the management controller 208 may be operable to interact with, and/or control the wireless network controller 204 independent of operations or availability of host 210. The host 210 may not be available, and/or operations and/or functions thereof, including the WLAN driver 316 and/or the host networking stack 310 for example, may not run or execute under certain conditions, such as pre-OS or post-OS scenarios.

In an exemplary embodiment of the invention, in pre-OS and/or post-OS scenarios, when host 210 may not be available, the management controller 208 may replace the host 210 with respect to owning and/or controlling the wireless network controller 204. In this regard, the management controller 208 may utilize the sideband interface 330, setup and/or utilized via the LAN sideband interface module 332 and WLAN sideband interface module 334, to control, configure, and/or drive the wireless network controller 204. The WLAN driver 322 of the management controller 208 may be utilized, for example, in driving the wireless network controller 204, substantially as described with regard to WLAN driver 316 of the host 210 for example. The wireless network controller 204 may be configured to provide direct pass-through routing of network traffic to and/or from management controller 208, without necessitating any traversing and/or routing via the host 210 or components thereof for example. Accordingly, the wireless network controller 204 may be utilized for receiving and/or transmitting management traffic even when the host 210 may not be available. When the host 210 becomes available, ownership and/or controller of the wireless network controller 204 may be handed off from the management controller 208 to the host 210. In this regard, the hand-off may be handled via the host 210, utilizing software components therein for example; the management controller 208, via management firmware that may be running therein for example; by wireless network controller 204; and/or any combination thereof.

The wireless network controller 204 may be configured to filter received network traffic 222, to determine whether the received traffic comprises management traffic. Only such management traffic may then be forwarded to the management controller 208 via the sideband interface 330, with other types of traffic being simply dropped. Alternatively, the wireless network controller 204 may not perform any management traffic filtering. Rather, all traffic communicated via the wireless network controller 204 may be handled by the management controller 208, with the sideband interface 330 being utilized to exchange data, including partially constructed and/or processed network packets, and/or messages pertaining to the received and/or transmitted traffic. Furthermore, in some embodiments, the management controller 208, autonomously and/or in conjunction with other functions of the network controller 202 may handle at least some of the other, non-management traffic received via the wireless network controller 202.

In an OS-absent receive path, after handling by the WLAN PHY/MAC processing block 312, partially processed packets may be forwarded (315) to the WLAN sideband interface module 334. The wireless network controller 204 may send an interrupt to the management controller 208, over the sideband interface 330, indicating that traffic has been received. The management controller 208 may request, forwarding of the packet between the wireless network controller 204 and the network controller 202 via sideband interface 330 for example. The packet may then be forwarded (309) from the LAN sideband interface module 332 to the management controller 208, where it may be handled. In this regard, the management controller 208 may be operable to perform packet filtering and may determine whether the packet comprises, for example, OOB management related messaging and/or information for example. The management controller may be operable to process the packet.

In an OS-absent transmit path, the management controller 208 may generate outbound management message, which may respond to previously received management requests and/or may comprise management related information, such as events and/or logs related data. The management controller 208 may also process the outbound management packet, utilizing the WLAN driver 322, to add, for example, necessary headers and/or footers in accordance with multi-layer OSI model based transmission. The management controller 208 may forward (309) the constructed management packet to the LAN sideband interface module 332. The LAN sideband interface module 332 may then forward the management packet to the wireless network controller 204, specifically the WLAN sideband interface module 334 thereof, utilizing the sideband interface 330. The WLAN sideband interface module 334 may forward (315) the received packet to the WLAN PHY/MAC processing block 312, to enable PHY and/or MAC processing thereon to facilitate transmission of corresponding wireless (WLAN) packets.

Figure 4:
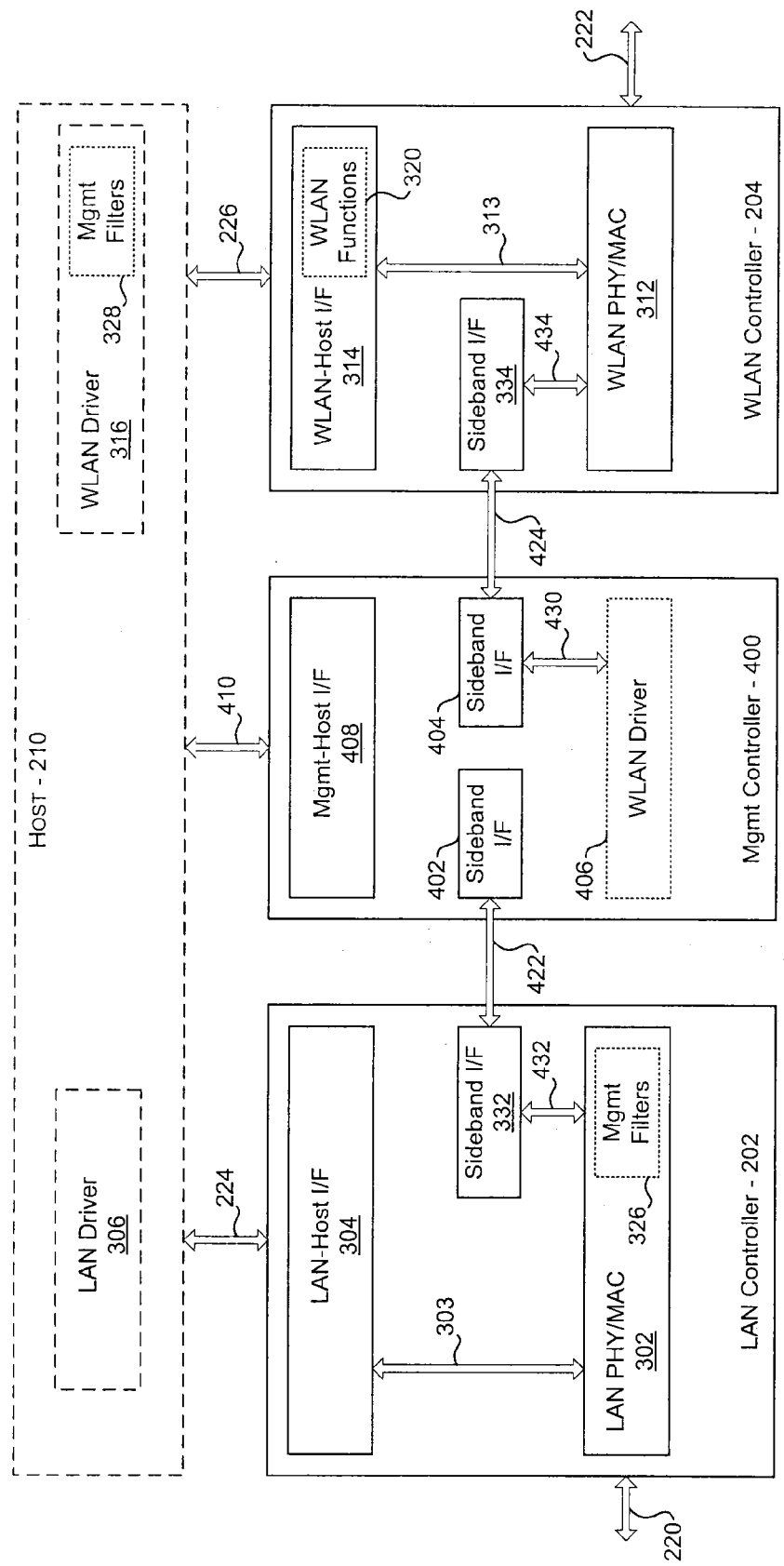
FIG. 4 is a block diagram illustrating an exemplary architecture for a network device that comprises a dedicated management controller, and which supports sideband communications between the management controller and wireless network controller, in accordance with an embodiment of the invention.

FIG. 4 is a block diagram illustrating an exemplary architecture for a network device that comprises a dedicated management controller, and which supports sideband communications between the management controller and wireless network controller, in accordance with an embodiment of the invention. Referring to FIG. 4, there is shown a management controller 400.

The management controller 400 may be similar to the management controller 208, substantially as described with regard to FIGS. 2, 3A, and 3B. The management controller 400, however, may be implemented as a separate dedicated component of the network device 200 rather than being embedded and/or integrated into the network controller 202.

The management controller 400 may be operable to support use of sideband communication in interacting with the network controller 202 and the wireless network controller 204. Accordingly, the management controller 400 may comprise a Mgmt-LAN sideband interface module 402 and a Mgmt-WLAN sideband interface module 404, which may be operable to establishing sideband interfaces 422 and 424 with the network controller 202 and the wireless network controller 204, respectively, and/or utilizing the sideband interfaces 422 and 424 for sideband communication. In this regard, the sideband interfaces 422 and 424 may be similar to the sideband interface 330, as described with regard to FIGS. 3A and 3B for example.

The management controller 400 may also comprise WLAN driver 406, which may be similar to the WLAN driver 322. In this regard, the WLAN driver 406 may enable supporting operations of the management controller 400 during host-assisted and/or host-independent handling of management traffic communicated via the wireless network controller 204, substantially as described with regard to WLAN driver 322 with respect to FIGS. 3A and 3B for example.

The management controller 400 may comprise Mgmt-host interface 408 may comprise suitable logic, circuitry, code, and/or interfaces that may enable interfacing and/or communication between the management controller 400 and the host 210, and/or any components thereof. The Mgmt-host interface 408 may support physical transfer of data between the management controller 400 and the host 210 utilizing one or more existing and/or available inter-system buses and/or interconnects. For example, the Mgmt-host interface 408 may support use of Peripheral Component Interconnect Express (PCI-E) bus to communicate management-host traffic 410 between the network controller 202 and the host 210, which may comprise management related messages and/or information pertaining to, for example, various out-of-band (OOB) related functions, features, and/or operations.

The management controller 400 may support and/or enable handling of wireless communication of management traffic, and/or performing or handling of management operations based thereon, including out-of-band (OOB) management functions and/or features, substantially as described with regard to FIGS. 3A and 3B. In this regard, the sideband communication between the management controller 400 and the wireless network controller 204 may be performed via sideband interface 424, which may be established between the Mgmt-WLAN sideband interface module 404 and the WLAN sideband interface module 334.

Sideband communication may also be utilized during handling of management traffic communicated via wired connections, utilizing the network controller 202, and/or when performing or handling management operations based thereon. In this regard, the sideband communication between the management controller 400 and the network controller 202 may be performed via sideband interface 424, which may be established between the Mgmt-WLAN sideband interface module 402 and the LAN sideband interface module 332.

Figures 5A, 5B:
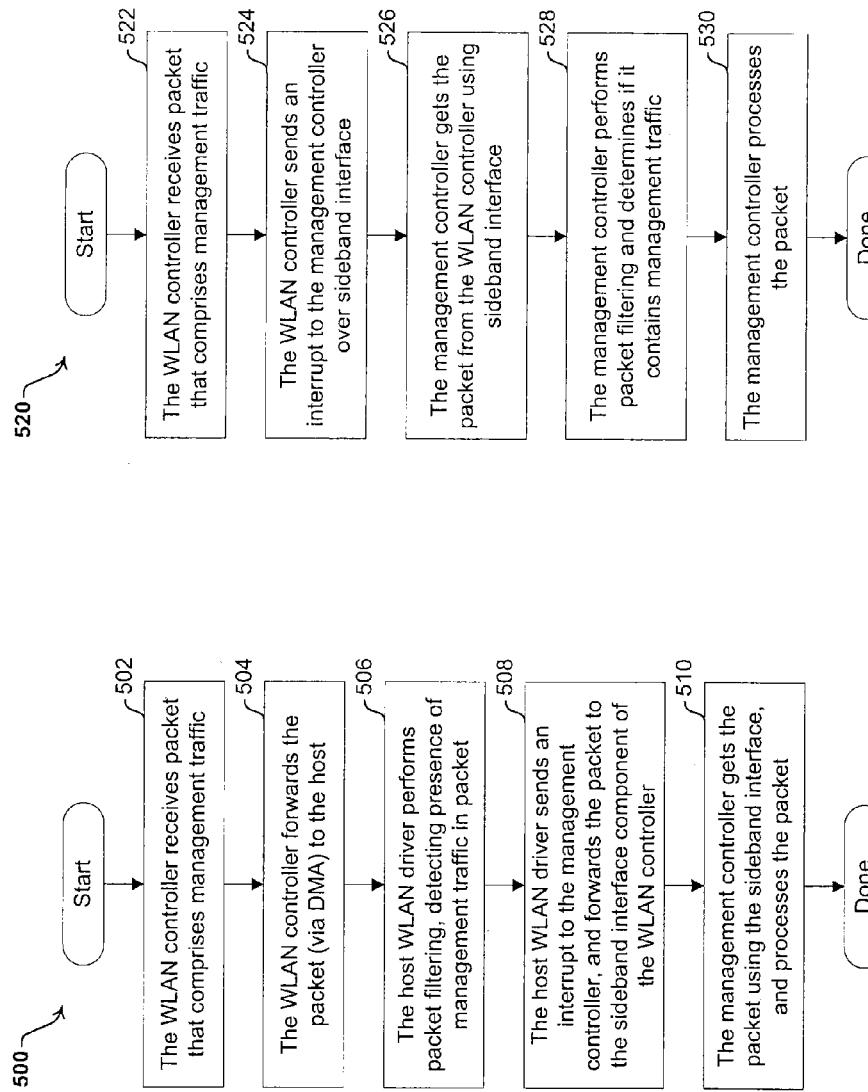
FIG. 5A is a flow chart that illustrates exemplary steps corresponding to the receive path during host-assisted handling of management traffic in a network device that incorporates sideband communication between a wireless controller and a management controller, in accordance with an embodiment of the invention.
FIG. 5B is a flow chart that illustrates exemplary steps corresponding to the receive path during host-independent handling of management traffic in a network device that incorporates sideband communication between wireless controller and management controller, in accordance with an embodiment of the invention.

FIG. 5A is a flow chart that illustrates exemplary steps corresponding to the receive path during host-assisted handling of management traffic in a network device that incorporates sideband communication between wireless controller and management controller, in accordance with an embodiment of the invention. Referring to FIG. 5A, there is shown a flow chart 500, comprising a plurality of exemplary steps that may be performed in a network device, such as the network device 200.

In step 502, a WLAN controller, such as the WLAN controller 204 of the network device, may receive a packet that may comprise management traffic. In step 504, the WLAN controller 204 may forward the packet, such as via DMA over PCI-E bus, to the host 210. In step 506, the host WLAN driver 316 may perform packet filtering and detect the presence of management traffic. In step 508, the host WLAN driver 316 may trigger an interrupt to the management controller 208, and may forward the packet into the WLAN sideband interface module 334. In step 510, the management controller 208 may get the packet using the sideband interface 330; and may process the packet. In this regard, the management controller 208 may perform one or more out-of-band (OOB) management operations and/or functions based on the management packet.

FIG. 5B is a flow chart that illustrates exemplary steps corresponding to the receive path during host-independent handling of management traffic in a network device that incorporates sideband communication between wireless controller and management controller, in accordance with an embodiment of the invention. Referring to FIG. 5B, there is shown a flow chart 520, comprising a plurality of exemplary steps that may be performed in a network device, such as the network device 200.

In step 522, the WLAN controller 204 may receive packet that may comprise management traffic. In step 524, the WLAN controller 204 may send an interrupt to the management controller 208 over the sideband interface 330. In step 526, the management controller 208 may get the packet from the WLAN controller 204 using sideband interface 330. In step 528, the management controller 208 may perform packet filtering and may determine whether the packet may comprise management traffic. In step 530, the management controller 208 processes the packet. In this regard, the management controller 208 may perform one or more out-of-band (OOB) management operations and/or functions based on the management packet.

FIG. 5C is a flow chart that illustrates exemplary steps corresponding to the transmit path during host-assisted handling of management traffic in a network device that incorporates sideband communication between wireless controller and management controller, in accordance with an embodiment of the invention. Referring to FIG. 5C, there is shown a flow chart 540, comprising a plurality of exemplary steps that may be performed in a network device, such as the network device 200.

In step 542, the management controller 208 may construct a management packet. In this regard, the management packet may be in response to previously received management request and/or may comprise management related information, such as events and/or logs data. In step 544, the management controller 208 may send the packet to the WLAN controller 204 over the sideband interface 330. In step 546, the WLAN controller 204 may trigger an interrupt to host WLAN driver 316, and may forward the packet to the host 210, such as via DMA over PCI-E bus. In step 548, the host WLAN driver 316 may process the packet, to added headers and/or additional information for example, and may queue the packet for transmission. In step 550, the WLAN controller 204 may forward the packet to the WLAN controller 204, such as via DMA over PCI-E bus for example, for transmission, such as via WLAN connection to the access point 230.

FIG. 5D is a flow chart that illustrates exemplary steps corresponding to the transmit path during host-independent handling of management traffic in a network device that incorporates sideband communication between wireless controller and management controller, in accordance with an embodiment of the invention. Referring to FIG. 5D, there is shown a flow chart 560, comprising a plurality of exemplary steps that may be performed in a network device, such as the network device 200.

In step 562, the management controller 208 may construct a management packet. In this regard, the management packet may be in response to previously received management request and/or may comprise management related information, such as events and/or logs data. Furthermore, the management controller 208 may be operable to perform, via the WLAN driver 322, at least a portion of required networking processing on the packet, to added needed headers and/or additional information required for multi-layer OSI model based transmission. In step 564, the management controller 208 may send the packet to the WLAN controller 204 over the sideband interface 330. In step 566, the WLAN controller 204 may transmit the packet wirelessly, such as via WLAN connection to the access point 230.

Various embodiments of the invention may comprise a method and system for sideband communication architecture for supporting manageability over wireless LAN (WLAN). In a network device 200, the management controller 208 may handle management traffic communicated wirelessly via wireless network controller 204, and/or may perform and/or support management operations based on the handled wireless management traffic. The management controller 208 may be integrated into network controller 202 in the network device 200. The management traffic may comprise out-of-band (OOB) management related traffic. The management controller 208 may support and/or handle wireless communication (222) of the management traffic, and/or may perform the management operations based thereon, independent of operations of the network device 200. A direct interface may be established between the management controller 208 and the wireless network controller 204, to support direct sideband communication between the management controller 208 and the wireless network controller 204. In this regard, at least a portion of the wireless management traffic may be communicated between the management controller 208 and the wireless network controller 204 via the sideband interface 330. The sideband interface 330 may incorporate and/or support Network controller 202 Sideband Interface (NC-SI) and/or Secure Digital Input Output (SDIO) based interactions and/or communications.

The wireless traffic communicated via the wireless network controller 204 may be routed via the host 210 in the network device 200 when the host 210 is available. In this regard, routing via the host 210 may comprise filtering inbound packets, via management filter 328, to determine if they comprise management traffic, and forwarding inbound management traffic received via the wireless network controller 204 back to the wireless network controller 204 for communication to the management controller 208. Outbound traffic may be forwarded to the host 210 from the wireless network controller 204, for additional networking related processing before being forwarded back to the wireless network controller 204, which may then communicated the outbound traffic wirelessly via one or more wireless connections, such as WLAN connections. In instances when the host 210 in the network device 200 may be unavailable, such as in pre-OS or post-OS scenarios, the management controller 208 may configure the wireless network controller 204 to provide direct pass-through routing of communicated network traffic to and/or from the management controller 208, via the sideband interface 330. The management controller 208 may control operations of the wireless network controller 204. In this regard, the WLAN driver 322 of the management controller 208 may be utilized in driving and/or controlling operations of the wireless network controller 204, such as in instances when the host 210 may be unavailable and accordingly the host WLAN driver 316 may not be running.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for sideband communication architecture for supporting manageability over wireless LAN (WLAN).

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A network device comprising:
a wireless network interface controller circuitry configured to receive wireless packets, including management traffic corresponding to a management protocol from a management device;
a host subsystem including a processor configured to filter the management traffic from the wireless packets received in the wireless network interface controller circuitry;
a management controller circuitry configured to execute management operations in accordance with the received management traffic, wherein
when in response to a determination that the host subsystem is available,
the processor of the host subsystem acquires wireless packets received in the wireless network interface controller circuitry, filters the management traffic from the wireless packets received in the wireless network interface controller circuitry, and forwards the filtered management traffic back to the wireless network interface controller circuitry which forwards the filtered management traffic to the management controller circuitry for execution of the management operations in accordance with the filtered management traffic, and
when in response to a determination that the host subsystem is unavailable, the wireless network interface controller circuitry forwards at least the management traffic to the management controller circuitry for execution of the management operations in accordance with the management traffic, independent of the host subsystem.

2. The network device of claim 1, wherein, in response to a determination that the host subsystem is unavailable, the wireless network interface controller circuitry filters the management traffic from the received wireless packets and forwards only the management traffic to the management controller circuitry.

3. The network device of claim 1, wherein, in response to a determination that the host subsystem is unavailable, the wireless network interface controller circuitry forwards all of the received wireless packets to the management controller circuitry.

4. The network device of claim 1, wherein the management controller circuitry is integrated into a local area network interface controller of the network device.

5. The network device of claim 1, wherein the management controller circuitry includes a wireless network driver circuitry which is configured to perform packet processing on an outgoing packet instead of a wireless network driver of the host subsystem in response to a determination that the host subsystem is unavailable.

6. A method for controlling a network device comprising:
receiving, by a wireless network interface controller circuitry of the network device, wireless packets, including management traffic corresponding to a management protocol from a management device;
filtering the management traffic from the wireless packets received in the wireless network interface controller circuitry;
executing, by a management controller circuitry of the network device, management operations in accordance with the received management traffic, wherein
when in response to a determination that a host subsystem of the network device configured to filter the management traffic is available, a processor of the host subsystem acquires wireless packets received in the wireless network interface controller circuitry, filters the management traffic from the wireless packets received in the wireless network interface controller circuitry, and forwards the filtered management traffic back to the wireless network interface controller circuitry, which forwards the filtered management traffic to the management controller circuitry for execution of the management operations in accordance with the filtered management traffic, and
when in response to a determination that the host subsystem is unavailable, the wireless network interface controller circuitry forwards at least the management traffic to the management controller circuitry for execution of the management operations in accordance with the management traffic, independent of the host subsystem.

7. The method of claim 6, wherein, in response to a determination that the host subsystem is unavailable, the wireless network interface controller circuitry filters the management traffic from the received wireless packets and forwards only the management traffic to the management controller circuitry.

8. The method of claim 6, wherein, in response to a determination that the host subsystem is unavailable, the wireless network interface controller circuitry forwards all of the received wireless packets to the management controller circuitry.

9. The method of claim 6, wherein the management controller circuitry is integrated into a local area network interface controller of the network device.

10. The method of claim 6, wherein the management controller circuitry includes a wireless network driver circuitry which is configured to perform packet processing on an outgoing packet instead of a wireless network driver of the host subsystem in response to a determination that the host subsystem is unavailable.

11. A non-transitory computer-readable storage medium storing computer-readable instructions thereon, winch, when executed by a processor, cause a network device to perform a method comprising:
    receiving, by a wireless network interface controller circuitry of the network device, wireless packets, including management traffic corresponding to a management protocol from a management device;
    filtering the management traffic from the wireless packets received in the wireless network interface controller circuitry;
    executing, by a management controller circuitry of the network device, management operations in accordance with the received management traffic, wherein
    when in response to a determination that a host subsystem of the network device configured to filter the management traffic is available, a processor of the host subsystem acquires wireless packets received in the wireless network interface controller circuitry, filters the management traffic from the wireless packets received in the wireless network interface controller circuitry, and forwards the filtered management traffic back to the wireless network interface controller circuitry which forwards the filtered management traffic to the management controller circuitry for execution of the management operations in accordance with the filtered management traffic, and
    when in response to a determination that the host subsystem is unavailable, the wireless network interface controller circuitry forwards at least the management traffic to the management controller circuitry for execution of the management operations in accordance with the management traffic, independent of the host subsystem.

12. The non-transitory computer-readable storage medium of claim 11, wherein, in response to a determination that the host subsystem is unavailable, the wireless network interface controller circuitry filters the management traffic from the received wireless packets and forwards only the management traffic to the management controller circuitry.

13. The non-transitory computer-readable storage medium of claim 11, wherein, in response to a determination that the host subsystem is unavailable, the wireless network interface controller circuitry forwards all of the received wireless packets to the management controller circuitry.

14. The non-transitory computer-readable storage medium of claim 11, wherein the management controller circuitry is integrated into a local area network interface controller of the network device.

15. The non-transitory computer-readable storage medium of claim 11, wherein the management controller circuitry includes a wireless network driver circuitry which is configured to perform packet processing on an outgoing packet instead of a wireless network driver of the host subsystem in response to a determination that the host subsystem is unavailable.

\* \* \* \* \*

UNITED STATES PATENT AND TRADEMARK OFFICE
CERTIFICATE OF CORRECTION

PATENT NO. : 9,872,205 B2  
APPLICATION NO. : 14/737172  
DATED : January 16, 2018  
INVENTOR(S) : Hemal Shah et al.

Page 1 of 1

It is certified that error appears in the above-identified patent and that said Letters Patent is hereby corrected as shown below:

In the Claims

Column 25, Line 19, Claim 11, change "winch" to --which--.

Signed and Sealed this
Eighteenth Day of June, 2019

Andrei Iancu
*Director of the United States Patent and Trademark Office*